UNITED STATES PATENT OFFICE.

ROBERT SKINNER AND BONNET BONNET, OF SAN FRANCISCO, CALIFORNIA, ASSIGNORS, BY MESNE ASSIGNMENTS, TO JAMES E. NUTTMAN, AND CHARLES E. WHITIN, TRUSTEE.

IMPROVEMENT IN CONCRETE PAVEMENTS.

Specification forming part of Letters Patent No. 105,502, dated July 19, 1870; Reissue No. 7,997, dated December 18, 1877; application filed November 26, 1877.

DIVISION B.

*To all whom it may concern:*

Be it known that we, ROBERT SKINNER and BONNET BONNET, of the city and county of San Francisco, in the State of California, have invented certain new and useful Improvements in Concrete Pavements; and that the following specification is a true, clear, and complete description thereof.

Said invention consists, partially, in a paving-concrete embodying earthy bituminous substances combined with mineral tar and with calcareous rock while the latter is thoroughly heated; and, further, in paving-blocks composed of concrete embodying earthy bituminous substances combined with mineral tar and heated calcareous rock, mixed while the rock is hot, and molded under heavy pressure.

The asphalt of California, employed in developing this invention, contains a much greater proportion of earthy matter than the usual asphalts of commerce. The asphalt is heated sufficiently to work it down into a granular mass, and to discharge therefrom the gases and watery vapors. The mineral tar is employed for properly tempering the asphalt.

The previous state of the art in concrete pavements embraces concretes of asphalt or coal tar, interchangeably employed, and broken limestone, boiled together and laid in mass, and also formed into "flags" and blocks, by pouring the same into molds and allowing it to cool, after the manner of casting.

Concretes of coal-tar, pine-tar, sand, gravel, and broken stone mixed, and molded into blocks under pressure, are also well known. In the preparation of these previous concretes it has been customary to employ fire-heat for drying the broken rock, sand, and earthy matter, and, although this drying process is essential, it is not enough in accordance with this invention that the calcareous rock be well dried; but it must be well heated prior to and at the time of compounding it with the asphalt and mineral tar. While thus well heated the rocky particles, coarse and fine, are more or less expanded, and the air is largely driven therefrom, so that when in that condition they are mixed with the asphalt and mineral tar, each particle becomes a prompt absorbent of the bitumen, and as the mass cools a practically-perfect union of the asphalt and stone is attained.

It is, therefore, to be distinctly understood that the concrete subject of these Letters Patent is limited not only to a composition containing asphalt, mineral tar, and calcareous rock, but also to the combining of these components while the calcareous rock is well heated.

Under no circumstances can the calcareous rock, however dry, be mixed while cold with the hot asphalt, and good results secured, either as regards absorption by the rocky particles or satisfactory working in molds, because the degree of heat requisite for properly treating the rock would be positively injurious to the asphalt. Moreover, the heat contained in the granulated rock secures good results while molding the blocks under heavy pressure in hydraulic or other presses.

Great care should be taken not to burn the limestone in heating it, because quicklime in asphalt-concretes is, for many reasons, positively objectionable.

The calcareous rock is crushed and granulated, preferably, so that all of it will pass through a quarter-inch-mesh screen, and such crushing insures a proper proportion of dust and fine particles.

The mixing of the concrete is effected by means of heated revolving cylinders, preferably provided with interior horizontal rods, or other appliances for tumbling the mass.

The blocks are best molded under the original heat of the concrete; but it can be done with reheating.

Eight hundred pounds of California asphalt, twenty gallons of mineral tar, and three hundred pounds of granulated and powdered calcareous rock, compounded with three hundred pounds of slag and three hundred pounds of coke, granulated and heated in like manner as the limestone, constitutes a concrete suitable for molding under pressure for the manufacture of paving-blocks.

Concrete, with more or less toughness and induration, may be produced by increasing or reducing the proportion of granulated calcareous rock.

What is claimed as new, and to be secured by these Letters Patent, is—

1. Paving-concrete containing asphalt, mineral tar, and granulated calcareous rock, previously heated, and mixed with the asphalt while the rock is hot, substantially as described.

2. Compressed concrete paving-blocks containing asphalt, mineral tar, and granulated calcareous rock, mixed after the rock has been well heated and while hot, substantially as described.

ROBERT SKINNER.
B. BONNET.

Witnesses:
S. M. THARP,
E. H. THARP.